March 22, 1960  J. W. PERRY ET AL  2,929,697
PROCESS OF MAKING PROPELLANTS FOR ROCKETS
Filed Oct. 30, 1947
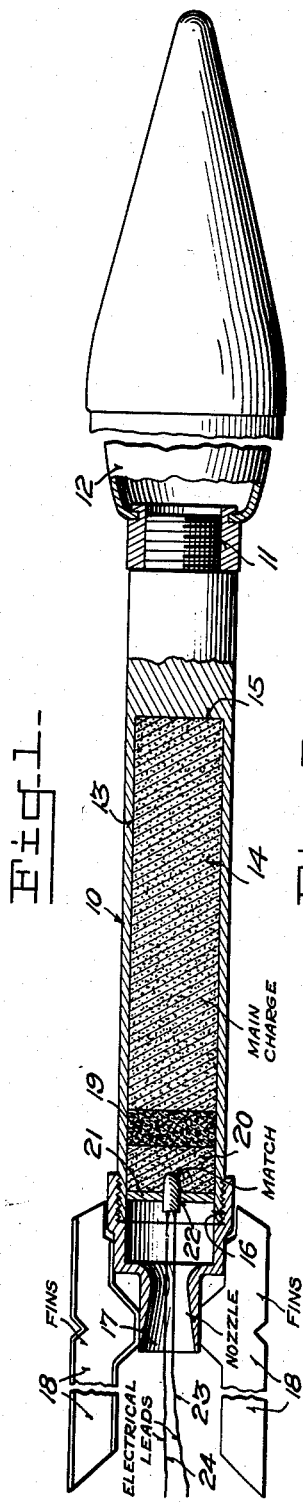
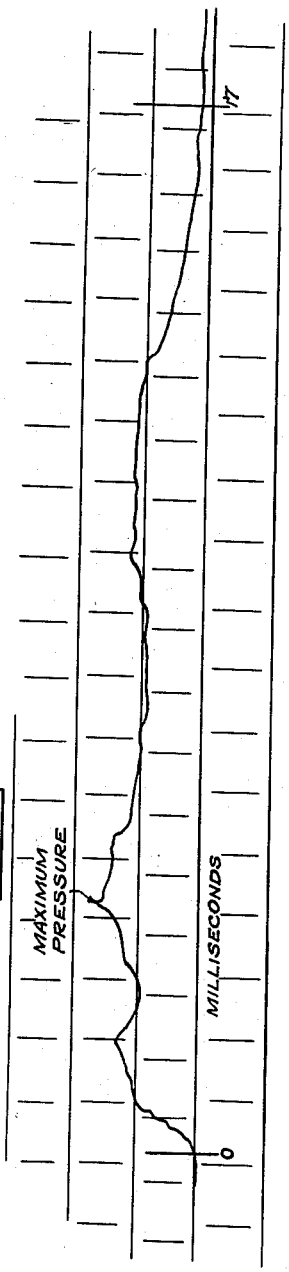
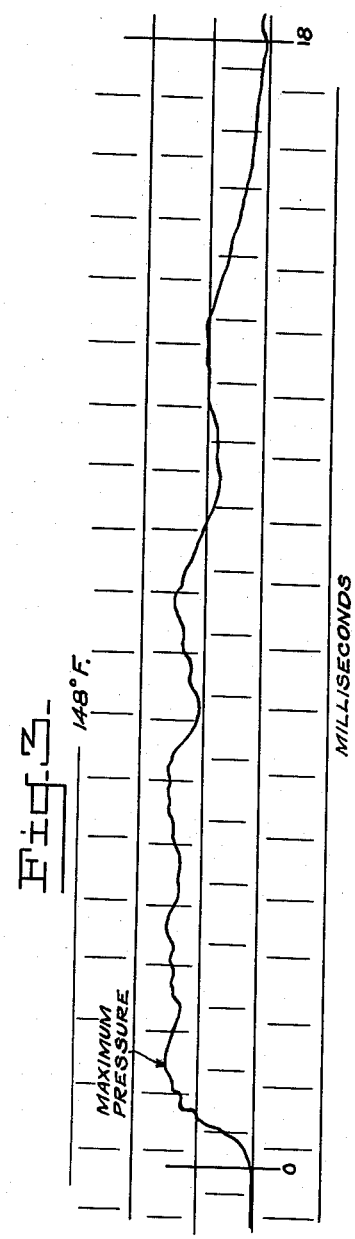
Inventors
JAMES W. PERRY, WILLIAM R. JOHNSON,
JOSEPH H. FRAZER, United States Patent Office 2,929,697
Patented Mar. 22, 1960

2,929,697

PROPELLANTS FOR ROCKETS AND PROCESS OF MAKING

James W. Perry, Newton Center, Mass., William R. Johnson, Texas City, Tex., and Joseph H. Frazer, Havre de Grace, Md.

Application October 30, 1947, Serial No. 783,034

6 Claims. (Cl. 52—.5)

(Granted under Title 35, U.S. Code (1952), sec. 266)

The invention described in the following specification and claims may be manufactured and used by or for the Government for governmental purposes without the payment to us of any royalty thereon.

This invention relates to a new process for preparing composite propellants in the form of compact pellets.

More particularly this invention relates to a novel process for making composite propellants by mixing together in the absence of a volatile solvent at least one finely divided inorganic compound containing readily available oxygen, at least one solid pulverized fuel, and a thermoplastic binder consisting of at least one high molecular weight organic, thermoplastic non-heat hardening material and at least one plasticizer at a temperature sufficiently low to prevent physical uniting of the component elements, and thereafter pressing the mixture into compact pellets under high pressure at a temperature considerably higher than that used during the mixing.

It is an object of the present invention to provide a new process for making propellants for rockets.

It is another object of the present invention to provide a new process for making composite propellants for rockets the burning characteristics of which are independent of temperature over a relatively wide range.

It is a further object of the present invention to provide a new process for making composite propellants for rockets which retain their elastic, rubber-like properties throughout such indicated temperature range.

It is a still further object of the present invention to provide a new process for making composite propellants, wherein the finely divided components of the composite propellant are mixed together, and subsequently pressed into the form of compact pellets.

It is still another object to provide a new process for making composite propellants wherein the step of mixing is carried out in the absence of volatile solvents, and wherein the step of forming the pellets is carried out under high pressure at temperature considerably higher than that used during the mixing step.

More particularly the new process of this invention consists of two fundamental steps:

(I) Mixing together the finely divided components of the composite propellant, with avoidance of introduction of volatile solvent into the propellant during the mixing process.

(II) Pressing under high pressure the mixed propellant into the form of compact pellets, the temperature of the propellant being considerably higher during at least one stage of the pressing step than at any stage of the mixing step.

Avoidance of the use of volatile solvent such as alcohol, ether, acetone, in the preparation of pellets of composite propellants is a particularly important advantage of this invention.

The new process of mixing and pressing propellants is particularly well adapted to preparing pellets of propellants consisting of the following components:

(I) At least one granular inorganic compound containing readily available oxygen, e.g. granular potassium perchlorate;

(II) At least one solid pulverized fuel material, e.g. powdered aluminum or powdered graphite;

(III) A thermoplastic, non-heat hardening binder consisting of at least two components, (a) At least one high molecular weight, organic, thermoplastic non-heat hardening material, and (b) One or more plasticizers for the thermoplastic material.

The new processing method of this invention has a number of important advantages. One of the most important advantages is provision of a simple method for preparing composite propellants containing a binder having elastic, rubbery or rubber-like properties. This is accomplished, in accordance with this invention, by carrying out the mixing step at a temperature which is sufficiently low so that the two components of the binder do not unite physically during mixing. It has been observed that at sufficiently low temperatures high molecular weight, thermoplastic materials in finely divided form do not enter into physical combination with plasticizers to form coherent masses. By using a sufficiently low temperature, the high molecular weight, organic thermoplastic material, is kept in a finely divided form during the mixing step, while the plasticizer may be either in the form of a liquid or a finely divided solid. How low the temperature must be depends on the solvent power of the plasticizer with respect to the thermoplastic material. Use of a sufficiently low temperature makes it possible to distribute easily both the finely divided thermoplastic material and the plasticizer evenly and uniformly throughout the whole mass of the propellent composition. During the subsequent pressing step, the temperature of the propellent composition is brought up to such a point that the plasticizer and the thermoplastic material enter into physical combination to form a soft homogeneous, thermoplastic, non-heat hardening mass, which, under the influence of the pressing pressure, is forced into, and fills the interstices between the particles of the other solid components of the propellant, thus forming a coherent, well compacted propellent pellet.

The following examples illustrate the invention:

*Example I*

This example illustrates a preferred manner of practicing the invention as applied to small caliber rockets. An explosive mixture referred to hereafter in this example as the "main charge" was prepared by the following procedure.

First there were weighed out:

1754 grams of granular potassium perchlorate previously dried in an oven at 100 to 110° C.;
482 grams of powdered or very finely divided graphite;
222 grams of finely powdered metallic titanium;
109 grams of finely powdered Vinylite of VYNU grade manufactured by Carbide and Carbon Chemicals Corp. This Vinylite is a high molecular weight copolymer of vinyl chloride and minor amounts of vinyl acetate.

The screen analysis of the potassium perchlorate was as follows:

.08% on 50 mesh
.86% on 70 mesh
6.4% on 100 mesh
14.67% on 140 mesh
29.5% on 200 mesh
48.4% through 200 mesh About 150 grams of the graphite was added to the perchlorate which was then placed on a U.S. standard 70 mesh screen and shaken. This screening broke up loose agglomerates of perchlorate, and the graphite coated the perchlorate granules and suppressed their tendency to form agglomerates. The screenings and the small residue on the screen, which was slightly larger in granulation than the mesh of the screen, were mixed together and this mixture was used as hereinafter described.

The perchlorate and graphite mixed therewith as described above, the balance of the graphite, weighed out as mentioned above, the 222 grams of finely powdered metallic titanium and the 109 grams of finely divided Vinylite were then intimately intermixed at ordinary temperatures, e.g., 50 to 90° F.

To the above obtained mixture was then added 163 grams of tributyl "Cellosolve" phosphate. Tributyl "Cellosolve" phosphate is the neutral phosphoric acid ester of monobutyl ether of ethylene glycol of the formula $OP(OCH_2CH_2OC_4H_9)_3$. Another plasticizer which gives results equivalent to tributyl "Cellosolve" phosphate is trioctyl phosphate. The batch was mixed for about 10 minutes by hand to break up the larger lumps resulting from addition of the liquid tributyl "Cellosolve" phosphate to the loose dry mixture of granular potassium perchlorate, graphite, powdered metallic titanium, and powdered Vinylite. The incorporation of the tributyl "Cellosolve" phosphate in the mass was completed with the aid of a ball mixer utilizing rubber stoppers ranging in size from No. 4 to No. 12 instead of the usual balls. This mixing operation is advantageously carried out at ordinary temperatures, e.g., 50 to 90° F. At the conclusion of this mixing operation, the mass was removed from the mixer and placed in moisture proof cardboard cartons. This mixture was used as the "main charge" in loading rockets as described below. The "main charge" as it was taken from the mixer resembled in appearance a dark colored, finely grained, slightly moistened sand. The mass retained this appearance even after storing for several months at ambient temperature.

The "booster" used in this example was prepared by using substantially the same procedure as used for mixing the "main charge," except for the fact that the component materials were somewhat different as follows:

1736 grams of granular potassium perchlorate (previously dried in an oven at 100 to 110° C.);
742 grams of powdered aluminum;
222 grams of finely powdered metallic titanium;
48 grams of finely powdered Vinylite VYNU.

The screen analysis of the potassium perchlorate was as follows:

.1% on 50 mesh
2.7% on 70 mesh
26.8% on 100 mesh
30.8% on 140 mesh
31.2% on 200 mesh
8.7% through 200 mesh Preparatory to mixing these materials about 150 grams of the aluminum powder was added to the weighed out portion of potassium perchlorate and shaken on a U.S. standard 70 mesh screen. The screening operation broke up loose agglomerates of perchlorate, and the aluminum powder suppressed the tendency of the perchlorate to form agglomerates. The screenings and the small residue on the screen, which was slightly larger in granulation than the mesh of the screen, were mixed together and the balance of the aluminum, the 222 grams of titanium and, the 48 grams of Vinylite VYNU were intimately intermixed in the same way as the "main charge" was mixed. To this mixture was added 72.0 grams of tributyl "Cellosolve" phosphate. The mixing procedure for incorporating the tributyl "Cellosolve" phosphate in the "booster" was the same as that used for incorporating the tributyl "Cellosolve" phosphate in the "main charge." The "booster" after mixing was placed in moisture proof cardboard cartons. The "booster" as it was taken from the mixer resembled a dark colored, finely grained, nearly dry sand. It has been noted that it retains this appearance even after storing for several months at ambient temperatures.

The procedure used in mixing the "igniter" was similar to that used in the first mixing step for the "main charge" and for the "booster." The "igniter" was prepared by mixing together the following:

958 grams of finely powdered metallic titanium
1385 grams of granular potassium perchlorate with the same screen analysis as the potassium perchlorate used in the "booster."

Preparatory to mixing the "igniter" a portion (about 100 grams) of the powdered titanium was mixed with the potassium perchlorate and the resulting mixture placed on a 70 mesh screen and shaken. This screening broke up the loose agglomerates of perchlorate and the titanium coated the perchlorate granules and suppressed their tendency to form agglomerates. The screenings and the small residue on the screen, which was slightly larger in granulation than the mesh of the screen, were mixed together. The balance of the weighed out portion of the titanium was added to this mixture, and these were intimately mixed. The igniter so prepared resembled a fine grained, dark colored, completely dry sand. The "igniter" showed no tendency to form lumps during storage at ambient temperatures in a moisture proof cardboard carton.

The following procedure was used in loading the "main charge," "booster," and "igniter" into motors of small caliber rockets.

First the interior of each rocket motor was cleansed by filling it with a warm, approximately 5% aqueous caustic soda solution and allowing it to stand for at least three hours. The interior of each motor was then brushed and rinsed several times with water. After draining out as much of the water as possible, each rocket motor was filled with acetone, the acetone drained out and the rocket motor allowed to dry. After carrying out the cleaning process, the rocket motors were ready to be loaded. The interior wall of each rocket motor was a smooth steel surface, free of paint, rust or other contamination.

Next 120 grams of "main charge" were weighed out and packed into a rocket motor cleaned as described above. A wooden stick was used to pack the "main charge" into the rocket motor. The "main charge" was then compacted further to 7500 p.s.i. at ambient temperature, e.g., 50 to 90° F., in a hydraulic press. This compacting may be done with the apparatus described in our application Serial No. 783,033, filed concurrently herewith, and now Patent No. 2,630,041.

Thereafter 20 grams of "booster" were weighed out and tamped into the rocket motor which was then heated electrically by means of a sleeve which fitted over the rocket motor. This sleeve was wound with Nichrome wire embedded in insulating material. A thermocouple embedded in the insulating material was used to check the heating coil's temperature, which was maintained at about 300 to 310° F. In order to establish when the powder charge had been heated sufficiently, a thermometer was used with its bulb buried in the unpressed "booster." When the thermometer read between 260° and 270° F., the thermometer was removed and the powder charge (both "main charge" and "booster") pressed in a hydraulic press immediately to a pressure of about 15,000 p.s.i. and maintained at this pressure for about three minutes. After removal from the hydraulic press the rocket motors were allowed to cool to 50 to 90° F. This pressing step may be advantageously performed in the apparatus described in our copending application Serial No. 783,033, filed concurrently herewith, and now Patent No. 2,630,041.

The loading was completed by weighing out 10 grams of "igniter" into the rocket motor and inserting an electric match mounted on a cardboard disc fitted to the interior of the rocket motor. The loaded motor was then assembled with other parts of the rocket.

Figure 1 in the accompanying drawing is a view partly in longitudinal section and partly in side elevation of a small caliber rocket loaded with propellant according to the present invention.

The steel motor of the rocket is indicated by the numeral 10. This motor is attached at its forward end by means of screw threads 11 to the head 12 which carries the high explosive charge of the rocket. The motor 10 comprises a cylindrical chamber 13 for the "main charge" 14 referred to above. This chamber extends from its closed forward end 15 to its rear threaded end 16. On the threaded end 16 there is attached the venturi nozzle 17 to which are secured the stabilizing fins or vanes 18.

To the rear and adjacent the "main charge" is positioned the "booster" 19 of the composition described above. The "main charge" 14 and the "booster" 19 are compressed into the chamber 13 under a pressure of about 15,000 p.s.i. as described above.

Located to the rear of and adjacent the "booster" 19 is the "igniter" 20 prepared as described above. A cardboard disc 21, which tightly fits into the cylindrical chamber 13, holds the relatively loose composition constituting the "igniter" 20 against the "booster" 19. In the center of the disc 21, and entering into the "igniter" 20, is fixed an electric match 22 having electrical leads 23 and 24 which lead to any convenient source of electricity for igniting the match 22. The ignition of the match 22 ignites the "igniter" 20, which in turn ignites the "booster" 19. The burning of the "booster" 19 ignites the main propelling charge 14.

From the foregoing it is to be observed that the propellent charge 14 consists of a mixture of finely divided potassium perchlorate, graphite and titanium bonded together as a mass or pellet by a non-heat hardening thermoplastic rubber-like binder which retains its rubber-like properties over a wide range of temperatures, for example, from minus 40° F. to plus 140° F. However, other non-heat hardening thermoplastic elastic or rubber-like binders retaining rubber-like properties over a lesser range of temperature may be employed, as long as they have rubber-like properties at the ambient temperatures under which the propellant is used. The thermoplastic binder was caused to flow by hot pressing into the spaces or interstices between the particles of potassium perchlorate, graphite and titanium, and upon cooling, in effect, constitutes a matrix in which the particles of potassium perchlorate, graphite and titanium are distributed and embedded.

The non-heat hardening thermoplastic binders specifically described have the further property of adhering tenaciously to the steel interior wall of the propellent chamber 13 of the rocket motor 14.

The non-heat hardening thermoplastic binders specifically mentioned herein have the property of retaining their elastic or rubber-like properties, even after repeated successive cooling and heating to minus 40° F. and plus 140° F., and such repeated cooling and heating does not impair the adhesion between the propellant and the metal walls of the propellent chamber.

A further important feature of the present invention is the fact that the "main charge" 14 in the rocket motor is end burning, and because the thermoplastic binder acting as a matrix for the particles of potassium perchlorate and fuels (graphite and titanium) adheres to the inner walls of the chamber 13, the burning of the propellant 14 is confined to the surface of the end nearer the nozzle 17.

A number of rockets were made and loaded according to this example, and then were divided into three groups. One group was cooled to bring each of its members throughout to a temperature of minus 35° C., another of the groups was warmed so that each of its members attained a temperature throughout of plus 130° F., while the third group was held at ambient room temperature of about 70 to 90° F. All three groups were then fired from a launcher with uniformly good results, there being no perceptible difference in action of the rockets forming the separate groups.

Pressure-time curves were obtained by static firing of propellent charges loaded as described in this example. Pressure-time curves were obtained on charges previously uniformly cooled to minus 30° C. and on charges previously warmed to plus 148° F. The charges were ignited while they were respectively at these temperatures. The results are shown graphically in Figures 2 and 3, Figure 2 being a representative pressure-time curve of a charge cooled to minus 30° C., and Figure 3 being a representative pressure-time curve of a charge warmed to plus 148° F.

Analysis of the curves shown in Figures 2 and 3 was made with the following results:

| Figure No. | Max. Pressure, lb./sq. in. | Burning Time, Milliseconds | Total Impulse, lb. sec. |
|---|---|---|---|
| 2 | 10,600 | 17 | 13.0 |
| 3 | 9,300 | 18 | 13.9 |

The pressure-time curves and their analysis show that changing the temperature of the propellant charges from about minus 30° C. to about plus 148° F. had surprisingly small effect on the burning behavior of the charges.

The total impulse in the above analysis is calculated as the product of (a) the average pressure within the chamber containing the propellant during the burning period, (b) the duration of the burning period, and (c) the cross sectional area of the nozzle throat.

Spin stabilized rockets, which usually have propellent chambers two or more inches in diameter, may be charged with propellants according to the present invention. This avoids the necessity of employing the complicated cage arrangements which are required to carry perforated grains or sticks of nitrocellulose propellants, e.g., ballastite; and further rockets utilizing propellants according to the present invention may be made to approach the shape and dimensions of artillery projectiles which have exterior ballistic properties superior to those of rockets of present conventional design.

Example II

This example is the same as Example I except that no booster 20 is necessary, and an intimate mixture of the following ingredients in the indicated proportions was used in the preparation of the main charge according to the procedure described in Example I;

1156 grams of dried granular potassium perchlorate having the same screen analysis as the potassium perchlorate used in the main charge of Example I;
594 grams of powdered or very finely divided aluminum;
148 grams of powdered titanium;
32 grams of powdered Vinylite VYNU;
48 grams of tributyl "Cellosolve" phosphate.

Preliminary to mixing these ingredients a part of the aluminum was first mixed with the potassium perchlorate and this mixture shaken on a screen as described in connection with the preparation of the booster in Example I.

A main charge prepared according to this example contained a smaller percentage of thermoplastic rubber-like binder than Example I. The reduction in the amount of binder is accompanied by an increased burning rate and an increase in maximum pressures developed. As a consequence, chambers designed to contain the main charge according to this example must be provided with walls of sufficient thickness to withstand the increased pressure.

*Example III*

This example is the same as Example I except that an intimate mixture of the following ingredients in the indicated proportions was used in the preparation of the main charge:

2315 grams of dried potassium perchlorate of screen analysis given below;
989 grams of powdered or finely divided aluminum;
296 grams of powdered titanium;
160 grams of powdered Vinylite VYNU;
240 grams of tributyl "Cellosolve" phosphate.

The screen analysis of the potassium perchlorate used was:

49.7% on 100 mesh
28.2% on 140 mesh
17.8% on 200 mesh
4.2% through 200.

Preliminary to mixing these ingredients a part of the aluminum was first mixed with the potassium perchlorate and this mixture shaken on a screen as described in connection with the preparation of the booster in Example I.

The function of the titanium in this and in the preceding examples is mainly for the purpose of increasing the burning rate of the charge. In addition to this function it also serves as a fuel for the potassium perchlorate. If it be omitted or its proportion decreased the burning rate is decreased and the functioning of the rocket may become erratic. The proportion of ingredients given above function very satisfactorily in a rocket of the type illustrated in Figure 1. At least 2% of titanium should be present in the prepared propellant if the titanium is to exert an appreciable accelerating effect on the burning rate of the propellant.

*Example IV*

This example is the same as Example I except that an intimate mixture of the following ingredients in the indicated proportions was used in the preparation of the main charge:

887 grams of dried potassium perchlorate having the same screen analysis as the potassium perchlorate used in the main charge of Example I;
463 grams of powdered or finely divided aluminum;
60 grams of powdered Vinylite VYNU;
90 grams of tributyl "Cellosolve" phosphate.

Preliminary to mixing these ingredients a part of the aluminum was first mixed with the potassium perchlorate and this mixture shaken on a screen as described in connection with the preparation of the booster in Example I.

It is to be noted that aluminum is the sole powdered metallic fuel in the main charge of this example. The omission of the titanium resulted in a slower burning rate of the main charge, as compared with similar main charges containing titanium and aluminum.

*Example V*

This example is the same as Example I except that an intimate mixture of the following ingredients in the indicated proportions was used in the preparation of the main charge:

877 grams of dried potassium perchlorate having the same screen analysis as the potassium perchlorate used in the main charge of Example I;
241 grams of powdered or finely divided graphite;
62.3 grams of powdered or finely divided aluminum;
27.6 grams of powdered titanium;
53.6 grams of powdered Vinylite VYNU;
80.4 grams of tributyl "Cellosolve" phosphate.

This main charge burns somewhat more slowly than the main charge prepared according to Example I.

*Example VI*

This example is the same as Example I except that an intimate mixture of the following ingredients in the indicated proportions was used in the preparation of the main charge:

877 grams of dried potassium perchlorate having the same screen analysis as the potassium perchlorate used in the main charge of Example I;
241 grams of powdered or finely divided graphite;
83 grams of powdered or finely divided aluminum;
53.4 grams of powdered Vinylite VYNU;
80.0 grams of tributyl "Cellosolve" phosphate.

The aluminum in this example is used to accelerate the burning rate of the graphite, but is far less effective than titanium in this respect. This main charge burns somewhat more slowly than the main charge prepared according to Example I.

We claim:

1. The process of preparing a propellant which comprises forming, substantially in the absence of volatile solvents, an intimate mixture comprising finely divided potassium perchlorate, finely divided graphite, finely divided titanium, a high molecular weight copolymer of vinyl chloride and vinyl acetate, and the phosphoric acid ester of monobutyl ether of ethylene glycol as a plasticizer for said copolymer, the forming of said mixture being carried out at a temperature which is sufficiently low so that the said plasticizer and the said copolymer do not unite physically in the mixture, and thereafter subjecting the said mixture to high pressure while heated to a temperature at which the said plasticizer and said copolymer enter into physical combination.

2. The process of preparing a propellant for rockets which comprises the steps of forming substantially in the absence of volatile solvents, an intimate mixture comprising a finely divided inorganic compound containing readily available oxygen, a solid pulverized fuel chosen from a group consisting of finely divided powdered aluminum, finely divided graphite, finely divided metallic titanium and a mixture thereof, a high molecular weight copolymer of vinyl chloride and vinyl acetate, a plasticizer for said copolymer chosen from a group consisting of neutral phosphoric acid ester of monobutyl ether of ethylene glycol and trioctyl phosphate, the forming of said mixture taking place at a temperature which is sufficiently low so that said plasticizer and said copolymer do not unite physically, and thereafter subjecting the said mixture to high pressure while heated to a temperature at which said plasticizer and said copolymer enter into physical combination.

3. The process of preparing a propellant for rockets which comprises the steps of forming substantially in the absence of volatile solvents, an intimate mixture comprising a finely divided granular inorganic compound containing readily available oxygen, a solid pulverized fuel, a high molecular weight copolymer of vinyl chloride and vinyl acetate, a plasticizer for said copolymer, the forming of said mixture taking place at atmospheric pressure and at a temperature which is sufficiently low so that said plasticizer and said copolymer do not unite physically in the mixture, and thereafter subjecting the said mixture to high pressure while heated to a temperature at which said plasticizer and said copolymer enter into physical combination whereby said propellant is bonded together as a mass by a non-heat hardening, thermoplastic binder which retains its rubber-like properties over a wide range of temperatures.

4. The process of preparing a propellant for rockets which comprises the steps of forming substantially in the absence of volatile solvents, an intimate mixture comprising a finely divided inorganic compound containing readily available oxygen, a solid pulverized fuel, a high molecular weight copolymer of vinyl chloride and vinyl acetate, a plasticizer for said copolymer chosen from a group consisting of neutral phosphoric acid ester of monobutyl ether of ethylene glycol and trioctyl phosphate, the forming of said mixture taking place at a temperature which is sufficiently low so that said plasticizer and said copolymer do not unite physically, and thereafter subjecting the said mixture to high pressure while heated to a temperature at which said plasticizer and said copolymer enter into physical combination.

5. The process of preparing a propellant for rockets which comprises the steps of forming substantially in the absence of volatile solvents, an intimate mixture comprising a finely divided granular inorganic compound containing readily available oxygen, a solid pulverized fuel, a high molecular weight, thermoplastic, non-heat hardening binder which retains its rubber-like, elastic properties over a predetermined range of temperatures, a plasticizer for said binder, the forming of said mixture taking place at atmospheric pressure and at a temperature which is sufficiently low so that said binder and said plasticizer do not unite physically in the mixture, and thereafter subjecting said mixture to high pressure while heated to a temperature at which said plasticizer and said binder enter into physical combination whereby said propellant is bonded together as a mass by a non-heat hardening, thermoplastic binder which retains its rubber-like properties over a wide range of temperatures.

6. The process of preparing a propellant for rockets having a metallic chamber for carrying said propellant which comprises the steps of forming substantially in the absence of volatile solvents, an intimate mixture comprising a finely divided granular inorganic compound containing readily available oxygen, a solid pulverized fuel, a high molecular weight, thermoplastic, non-heat hardening binder which retains its rubber-like, elastic properties over a predetermined range of temperatures, a plasticizer for said binder, the forming of said mixture taking place at a temperature which is sufficiently low so that said binder and said plasticizer do not unite physically in the mixture, and thereafter compacting said mixture under high pressure in the chamber of said rocket while heated to a temperature at which said plasticizer and said binder enter into physical combination whereby said propellant is bonded together as a mass by said non-heat hardening thermoplastic binder and thereby acquires excellent adhesive properties as regards the walls of said chamber.

References Cited in the file of this patent

UNITED STATES PATENTS

| | | |
|---|---|---|
| 2,012,866 | Decker et al. | Mar. 12, 1932 |
| 2,165,263 | Holm | July 11, 1939 |
| 2,171,379 | Wahl | Aug. 29, 1939 |

FOREIGN PATENTS

| | | |
|---|---|---|
| 2,172 | Great Britain | 1915 |
| 500,298 | Great Britain | Feb. 7, 1939 |
| 570,075 | Great Britain | Nov., 1942 |

OTHER REFERENCES

"Journal of the American Rocket Society," Nos. 66 and 67, June and September 1946, page 6.